(12) United States Patent
McBay

(10) Patent No.: US 10,914,293 B2
(45) Date of Patent: Feb. 9, 2021

(54) METHOD, SYSTEM AND APPARATUS FOR EXTRACTING HEAT ENERGY FROM GEOTHERMAL BRINY FLUID

(71) Applicant: David Alan McBay, Palo Alto, CA (US)

(72) Inventor: David Alan McBay, Palo Alto, CA (US)

(*) Notice: Subject to any disclaimer, the term of this patent is extended or adjusted under 35 U.S.C. 154(b) by 0 days.

(21) Appl. No.: 16/447,256

(22) Filed: Jun. 20, 2019

(65) Prior Publication Data

US 2019/0390660 A1  Dec. 26, 2019

Related U.S. Application Data

(60) Provisional application No. 62/687,385, filed on Jun. 20, 2018.

(51) Int. Cl.
*F03G 7/04* (2006.01)

(52) U.S. Cl.
CPC ...................... *F03G 7/04* (2013.01)

(58) Field of Classification Search
CPC ............................ Y02E 10/10–18; F03G 7/04
USPC .............................................. 60/641.2–641.5
See application file for complete search history.

(56) References Cited

U.S. PATENT DOCUMENTS

| | | |
|---|---|---|
| 3,967,448 A | 7/1976 | Matthews |
| 4,138,851 A | 2/1979 | Rogers et al. |
| 4,152,898 A | 5/1979 | Awerbuch |
| 4,211,613 A * | 7/1980 | Meckler ................ C02F 1/14 203/11 |
| 4,429,535 A | 2/1984 | Featherstone |
| 4,492,083 A | 1/1985 | McCabe et al. |
| 4,727,930 A | 3/1988 | Bruckner et al. |
| 5,254,225 A | 10/1993 | Gallup |
| 5,372,016 A * | 12/1994 | Rawlings ............ F28D 20/0052 62/260 |
| 5,623,986 A | 4/1997 | Wiggs |

(Continued)

FOREIGN PATENT DOCUMENTS

| | | |
|---|---|---|
| AU | 2018262109 A1 | 8/2019 |
| CA | 2893160 C | 2/2017 |

(Continued)

OTHER PUBLICATIONS

1414 Degrees, Silicon Thermal Energy Storage System; accessible at https://1414degrees.com.au/ [no document].

(Continued)

*Primary Examiner* — Mark A Laurenzi
*Assistant Examiner* — Mickey H France
(74) *Attorney, Agent, or Firm* — Perkins Coie LLP; Brian Coleman

(57) ABSTRACT

The present disclosure relates to techniques for extracting heat energy from geothermal briny fluid. A briny fluid can be extracted from a geothermal production well and delivered to a heat exchanger. The heat exchanger can receive the briny fluid and transfer heat energy from the briny fluid to a molten salt. The molten salt can be pumped to a molten salt storage tank that can serve as energy storage. The briny fluid can be returned to a geothermal source via the production well. The briny fluid can remain in a closed-loop system, apart from the molten salt, from extraction through return to the geothermal production well.

26 Claims, 9 Drawing Sheets

(56) References Cited

U.S. PATENT DOCUMENTS

| | | | |
|---|---|---|---|
| 5,816,314 A | 10/1998 | Wiggs et al. | |
| 6,138,744 A | 10/2000 | Coffee | |
| 6,820,421 B2 | 11/2004 | Kalina | |
| 8,640,462 B2 | 2/2014 | Shnell | |
| 8,708,046 B2 | 4/2014 | Montgomery et al. | |
| 8,776,867 B2 | 7/2014 | Stojanowski | |
| 8,820,394 B2 | 9/2014 | Azzam | |
| 8,966,902 B2 | 3/2015 | Stiesdal | |
| 9,051,827 B1 | 6/2015 | Harrison | |
| 9,115,937 B2 | 8/2015 | Perryman | |
| 9,222,371 B2 | 12/2015 | Farkaly | |
| 9,389,002 B2 | 7/2016 | Cuthbert et al. | |
| 9,593,866 B2 | 3/2017 | Baldwin | |
| 9,644,126 B2 | 5/2017 | Harrison et al. | |
| 9,765,251 B2 | 9/2017 | Dhau et al. | |
| 2002/0112888 A1 | 8/2002 | Leuchtenberg | |
| 2003/0010652 A1 | 1/2003 | Hunt | |
| 2010/0071366 A1 | 3/2010 | Klemencic | |
| 2010/0180593 A1 | 7/2010 | Schaller et al. | |
| 2010/0230075 A1 | 9/2010 | Mathur et al. | |
| 2010/0276115 A1 | 11/2010 | Parrella | |
| 2011/0048408 A1* | 3/2011 | Newman | F24S 60/30 126/646 |
| 2011/0100356 A1 | 5/2011 | Bliesner | |
| 2011/0100611 A1 | 5/2011 | Ohler et al. | |
| 2011/0232858 A1 | 9/2011 | Hara | |
| 2011/0314812 A1 | 12/2011 | Sonwane | |
| 2012/0067551 A1 | 3/2012 | Ganapathi | |
| 2012/0174581 A1 | 7/2012 | Vaughan et al. | |
| 2013/0192792 A1 | 8/2013 | Krakow et al. | |
| 2013/0255667 A1 | 10/2013 | Ma et al. | |
| 2013/0300127 A1 | 11/2013 | Dinicolantonio | |
| 2013/0340432 A1 | 12/2013 | Hunt et al. | |
| 2014/0102946 A1 | 4/2014 | Harrison et al. | |
| 2014/0166924 A1 | 6/2014 | Raade et al. | |
| 2014/0262137 A1 | 9/2014 | McBay | |
| 2014/0299122 A1 | 10/2014 | Muren et al. | |
| 2014/0366535 A1* | 12/2014 | Harrison | F03G 7/04 60/641.5 |
| 2014/0366536 A1 | 12/2014 | Muren | |
| 2015/0010875 A1 | 1/2015 | Raade et al. | |
| 2015/0060008 A1 | 3/2015 | Wirz et al. | |
| 2015/0107244 A1 | 4/2015 | Lakic | |
| 2015/0159917 A1 | 6/2015 | Parrella et al. | |
| 2015/0159959 A1 | 6/2015 | Petrovic | |
| 2015/0167422 A1 | 6/2015 | Loveday et al. | |
| 2015/0167499 A1* | 6/2015 | Shinozaki | F01K 3/12 60/641.8 |
| 2015/0303525 A1 | 10/2015 | Bradwell et al. | |
| 2016/0084587 A1 | 3/2016 | Kröger | |
| 2016/0115945 A1 | 4/2016 | Barsi et al. | |
| 2016/0344082 A1 | 11/2016 | Tzidon et al. | |
| 2017/0067667 A1 | 3/2017 | Choi | |
| 2017/0219293 A1 | 8/2017 | Kreuger | |
| 2017/0283676 A1* | 10/2017 | Pramod | F24S 80/20 |
| 2018/0135604 A1 | 5/2018 | Nissen et al. | |
| 2018/0172318 A1 | 6/2018 | Woods | |
| 2018/0224164 A1 | 8/2018 | Lakic | |
| 2019/0161665 A1 | 5/2019 | Bannari | |
| 2019/0260012 A1 | 8/2019 | Zhang | |
| 2019/0274233 A1 | 9/2019 | Lee | |

FOREIGN PATENT DOCUMENTS

| | | |
|---|---|---|
| CA | 2916811 A1 | 7/2017 |
| CH | 610927 A5 | 5/1979 |
| CN | 101440785 A | 5/2009 |
| CN | 101508888 A | 8/2009 |
| CN | 102032824 A | 4/2011 |
| CN | 102432247 A | 5/2012 |
| CN | 102583454 A | 7/2012 |
| CN | 103471256 A | 12/2013 |
| CN | 103603639 A | 2/2014 |
| CN | 103615840 A | 3/2014 |
| CN | 103911126 A | 7/2014 |
| CN | 104728061 A | 6/2015 |
| CN | 204572361 U | 8/2015 |
| CN | 103509526 B | 1/2016 |
| CN | 105420737 A | 3/2016 |
| CN | 105463306 A | 4/2016 |
| CN | 105569938 A | 5/2016 |
| CN | 105670571 A | 6/2016 |
| CN | 105838337 A | 8/2016 |
| CN | 105838338 A | 8/2016 |
| CN | 105839129 A | 8/2016 |
| CN | 106225049 A | 12/2016 |
| CN | 106438237 A | 2/2017 |
| CN | 104559940 B | 5/2017 |
| CN | 206191713 U | 5/2017 |
| CN | 107939621 A | 4/2018 |
| CN | 109114647 A | 1/2019 |
| CN | 109161877 A | 1/2019 |
| CN | 109181649 A | 1/2019 |
| CN | 109233746 A | 1/2019 |
| CN | 109233751 A | 1/2019 |
| CN | 109403917 A | 3/2019 |
| CN | 109539215 A | 3/2019 |
| CN | 109546162 A | 3/2019 |
| CN | 208562229 U | 3/2019 |
| CN | 208619184 U | 3/2019 |
| CN | 109595176 A | 4/2019 |
| CN | 109631645 A | 4/2019 |
| CN | 208765550 U | 4/2019 |
| CN | 109724276 A | 5/2019 |
| CN | 109733754 A | 5/2019 |
| CN | 109737602 A | 5/2019 |
| CN | 109777365 A | 5/2019 |
| CN | 208831047 U | 5/2019 |
| CN | 208859589 U | 5/2019 |
| CN | 208887165 U | 5/2019 |
| EP | 2274567 A2 | 1/2011 |
| EP | 2764316 A1 | 8/2014 |
| EP | 2976588 A1 | 1/2016 |
| EP | 2989405 A1 | 3/2016 |
| EP | 2867603 B1 | 11/2016 |
| FR | 2298768 A1 | 8/1976 |
| GB | 2509537 A | 7/2014 |
| JP | 2014084857 A | 5/2014 |
| JP | 2019082171 A | 5/2019 |
| PH | 12018501789 A1 | 6/2019 |
| WO | 2010085574 A1 | 7/2010 |
| WO | 2010144073 A1 | 12/2010 |
| WO | 2011031894 A3 | 7/2011 |
| WO | 2012008992 A1 | 1/2012 |
| WO | 2012104060 A1 | 8/2012 |
| WO | 2012129331 A1 | 9/2012 |
| WO | 2013003055 A1 | 1/2013 |
| WO | 2013005192 A1 | 1/2013 |
| WO | 2014062464 A1 | 4/2014 |
| WO | 2014074930 A1 | 5/2014 |
| WO | 2014113107 A1 | 7/2014 |
| WO | 2015189517 A1 | 12/2015 |
| WO | 2016074092 A1 | 5/2016 |
| WO | 2016113438 A1 | 7/2016 |
| WO | 2016164341 A1 | 10/2016 |
| WO | 2016169867 A1 | 10/2016 |
| WO | 2016187189 A1 | 11/2016 |
| WO | 2017003198 A1 | 1/2017 |
| WO | 2017083598 A2 | 5/2017 |
| WO | 2018102265 A1 | 6/2018 |
| WO | 2019037804 A1 | 2/2019 |
| WO | 2019094921 A1 | 5/2019 |
| WO | 2019095444 A1 | 5/2019 |
| WO | 2019105448 A1 | 6/2019 |
| WO | 2019148105 A1 | 8/2019 |

OTHER PUBLICATIONS

Heseco, Thermal Fluid Systems, accessed Oct. 2, 2019, from http://www.heseco.com/thermalfluid.htm, 3 pages.

Mokon, Heat Transfer Oil Systems, accessed Oct. 2, 2019, from https://www.mokon.com/products/heat-transfer-oil-systems/?gclid=

(56) References Cited

OTHER PUBLICATIONS

EAlalQobChMIp8X97uHC5AIVA9vACh0wdgZXEAAYAiAAEgLs-IfD_BwE, 3 pages.
Pirobloc, Heat Exchangers, accessed Oct. 2, 2019, from https://www.pirobloc.com/en/products/heat-exchangers/, 7 pages.
Sigma Thermal, Thermal Fluid Systems, accessed Oct. 2, 2019, from https://www.sigmathermal.com/products/thermal-fluid-systems/, 8 pages.
Vorrath, S., "MIT team gains ground on molten silicon energy storage concept," Renew Economy, Clean Energy News and Analysis, Dec. 2018, accessed Oct. 2, 2019, from https://reneweconomy.com.au/mit-team-gains-ground-on-molten-silicon-energy-storage-concept-23077/, 3 pages.
Wang, B., "Molten Silicon thermal energy storage system has higher energy density and ten times lower cost than lithium ion batteries for utility storage," next BIG Future, Feb. 2, 2017, accessed Oct. 2, 2019, from https://www.nextbigfuture.com/2017/02/molten-silicon-thermal-energy-storage.html, 5 pages.

\* cited by examiner

METHOD, SYSTEM AND APPARATUS FOR EXTRACTING HEAT ENERGY FROM GEOTHERMAL BRINY FLUID

CROSS-REFERENCE TO RELATED APPLICATIONS

This application claims the benefit of U.S. Provisional Patent Application Ser. No. 62/687,385, filed Jun. 20, 2018, which is incorporated by reference herein in its entirety.

TECHNICAL FIELD

The present disclosure relates to geothermal energy extraction, and more specifically, to extracting heat energy from geothermal briny fluid.

BACKGROUND

Heat energy lies beneath the surface of the Earth, in the form of geothermal energy. With the core of the Earth believed to be over 5,000° C., there is enough heat stored from the original formation of the Earth and generated by ongoing radioactive decay to provide a vast supply of energy.

However, many problems commonly occur in attempting to utilize geothermal energy relate to accessing the geothermal energy, as the surface of the Earth is significantly cooler in temperature than the interior portions of the Earth. The average geothermal gradient is about 25° C. for every kilometer of depth below the Earth's surface. Accordingly, the temperature at the bottom of a well that is 5 km deep can be approximately 125° C. or more.

In many cases, various entities can drill into the Earth for resources (e.g., oil) at similar depths (e.g., up to 12 km depths). However, to operate in a well of these depths can be extremely resource-intensive.

Further, within a proximity to geological fault zones, fractures in the Earth's crust allow magma to come much closer to the surface. This may give rise to geothermal landforms such as volcanoes, natural hot springs, and geysers. As an example, in the seismically active Long Valley Caldera of California, magma at a temperature more than 700° C. is believed to lie at a depth of only 6 km below the Earth's surface. Alternatively, if lower temperatures can be utilized, a well at a depth less than 1 km in a geothermal zone can achieve temperatures over 100° C. A well only 1 km deep often be much less resource-intensive than operating a deeper well.

At some sites, drilling may be unnecessary due to preexisting drilling activities. As an example, previous oil-prospecting areas have left many subterranean wells, where some of these wells may reach deep enough below the surface of the Earth to capture geothermal heat. For these wells, only surface infrastructure may need to be supplied to allow this source of heat to be captured.

SUMMARY

The disclosed technology involves transferring heat energy from a closed-loop briny fluid system to molten salt. The closed-loop briny fluid system may include an extraction well and an injection well extending deep into the Earth. The depth of the extraction and injection wells can be a function of a geothermal temperature gradient. Briny fluid extracted via the extraction well may be directed into a heat exchanger configured to transfer heat energy from the briny fluid to a molten salt system. Since a closed-loop system is used, all or substantially all briny fluid is returned to a geothermal source, via the injection well, after extracting heat energy. The molten salt can store heat energy for an extended period of time. The molten salt can also be used to transport the stored heat energy to another location. For example, the molten salt can be used to transfer the stored heat energy to a remote electric generating unit (EGU).

BRIEF DESCRIPTION OF THE DRAWINGS

These and other objects, features and characteristics of the present disclosure will become more apparent to those skilled in the art from a study of the following detailed description in conjunction with the appended claims and drawings, all of which form a part of this specification.

DETAILED DESCRIPTION

In many cases, geothermal technologies may result in scaling due to flash steam processing of briny fluid and may be unable to reinject substantially all briny fluid back into a geothermal well after extracting heat energy. Conventional geothermal technologies may be unable to store energy for later use and cannot transport heat to a secondary location for heat processes or electricity production. Further, these geothermal technologies may have a high likelihood of toxic steam releases, especially during a plant shutdown.

The disclosed embodiments may solve the issues inherent in many geothermal processes involving extraction of heat energy from geothermal briny fluids. In an embodiment, heat energy is transferred from the briny fluid to molten salt via a heat exchanger. In an embodiment, heat energy is transferred directly from briny fluid to a rock bed. Energy extracted from the geothermal fluid can be used to heat electrodes in a molten silicon or molten glass storage tank. Heat energy can be transferred from the molten salt to thermal oil or hot water. In an embodiment, one or more materials (e.g., lithium) can be extracted from the briny fluid.

Since the briny fluid is not flash processed as in other techniques, the equipment is not limited by scaling results. In addition, a closed-loop system may be used so all or substantially all briny fluid is returned to a geothermal well after extracting heat energy. Since, for example, heat energy may be transferred directly to molten salt, the molten salt can store heat energy for an extended period of time. The molten salt can also be used to transport the stored heat energy to another location. In addition, the molten salt can be used to transfer heat to other materials (e.g., thermal fluids). For example, the molten salt can be used to transfer the stored heat energy to a remote electric generating unit (EGU).

Figure 1:
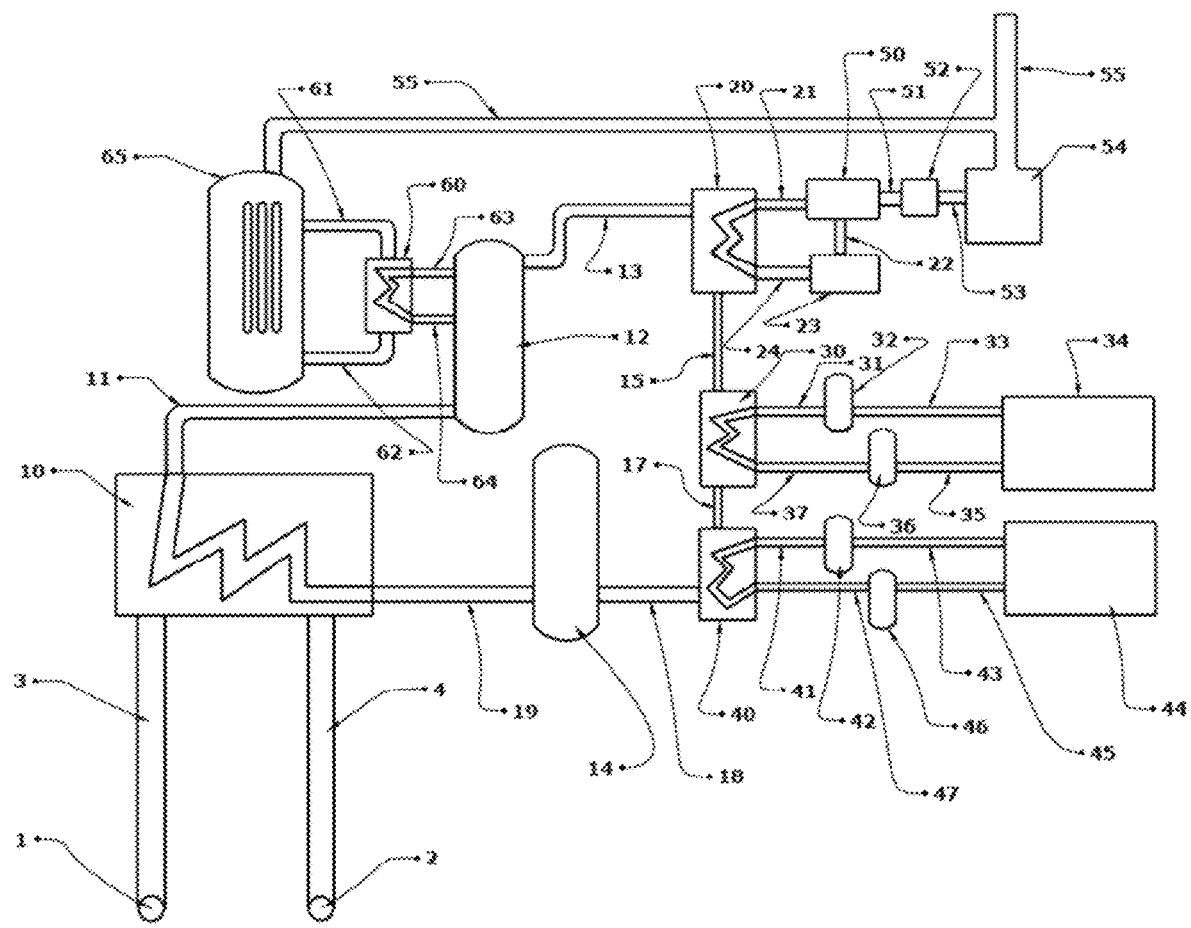
FIG. 1 illustrates a block diagram of a system to extract heat energy from geothermal briny fluids, in accordance with various embodiments.

FIG. 1 illustrates a block diagram of a system to extract heat energy from geothermal briny fluids, in accordance with various embodiments. The embodiment as shown in FIG. 1 may employ a molten salt geothermal energy collection system to extract heat energy from geothermal briny fluids.

A geothermal resource can include briny fluid with a temperature range of 175° C.-800° C. The temperature of the briny fluid within the geothermal resource can be a function of depth. Briny fluids in the 175° C.-800° C. range can be extracted through a production well 1 and channeled through velocity control valves and pumps to enter into a Hot Briny Fluid Inlet Pipe to Briny Fluid to Molten Salt Heat Exchanger 2 that may transfer the heat from briny fluid to molten salt.

The velocity control valves, pumps, and related components can be made of oxidation-corrosion-resistant materials such as, for example, stainless steel, Inconel alloys, or duplex piping. In an embodiment, the oxidation-corrosion-resistant materials can be predominantly made of non-ferrous metals such as, for example, chromium and/or nickel. In addition, the velocity control valves, pumps and related components can be lined with corrosive resistant chemicals or materials such as, for example, high-density polyethylene (HDPE).

The velocity control valves and pumps can control pressure between the production well 1, briny fluid to molten salt heat exchanger 10, and injection well 3. For example, the velocity control valves and pumps can be used to maintain constant pressure. To maintain a constant pressure, the valves and pumps can change the flow rate of the briny fluid based on a series of sensors. The sensors can check flow rate of the briny fluid at checkpoints in the system. In one embodiment, sensors can be incorporated at the base of the production well, before and after valves and pumps, inside heat exchangers, and at the base of the injection well. If any of the sensors detect pressure (e.g., in psi) that is less than or more than the pressure inside the geothermal source, the sensor can indicate to the valves and pumps to adjust the pressure. For example, the sensor at the base of the production well may indicate 900 psi. However, the sensor at the base of the injection well may indicate 500 psi. The sensor at the base of the injection well can then indicate to the valves and pumps to speed up the flow rate to match 900 psi. In some embodiments, all valves and pumps incorporated in the system can act simultaneously. In other embodiments, some valves and pumps may act separately from others.

The molten salt can include eutectic mixtures of different salts (e.g., sodium nitrate, potassium nitrate, and/or calcium nitrate). The molten salt may transfer from the briny fluid to molten salt heat exchanger 10 to the hot molten salt storage tank 7 via a first pipe 5.

Cold molten salt from a cold molten salt storage tank 8 may travel to the briny fluid to molten salt heat exchanger 10 via a second pipe 6. The cold molten salt may be heated at the briny fluid to molten salt heat exchanger 10 by the briny fluid, where the heated molten salt may be pumped to hot molten salt storage tank 7 via the first pipe 5. The hot molten salt in the hot molten storage tank 7 can be distributed through a facility (e.g., an industrial complex) and/or directed to an energy generating unit. In an embodiment, graphite blocks with channels can be used to absorb heat from the briny fluid and for heat energy storage.

In an embodiment, nano-particles can be added to the molten salt at any point in the closed-loop system. The thermal storage capacity of the molten salt and nano-particle mixture may be up to 30% higher than with molten salt alone. Nano-particles include, for example, copper encrusted graphite or graphene. For example, graphene can be added to molten salt in the hot molten salt tank or in the briny fluid to molten salt heat exchanger.

The briny fluid to molten salt heat exchanger 10 may be used to transfer heat from the extracted briny fluid to molten salt. The briny fluid and molten salt can be separated, for example, by a thermally conductive wall. The thermally conductive wall can exhibit a thermally conductive property at a high pressure. The thermally conductive wall can include, for example, copper, silver, diamond (e.g., pure, impure, and/or isotopically enriched), gold, aluminum, carbon fiber, stainless steel titanium alloys, or any combination thereof. In an embodiment, the thermally conductive wall can include a layer of isotopically enriched diamond adjacent to a briny fluid chamber and a layer of copper adjacent to a molten salt chamber. The isotopically enriched diamond layer can be used adjacent to the briny fluid chamber to reduce corrosion while maintaining a high thermal conductivity.

In one embodiment, the briny fluid to molten salt heat exchanger 10 includes a temperature sensor. The temperature sensor can sense the temperature of both the briny fluid and the molten salt. Once the temperature of the briny fluid, molten salt, or both have reached pre-set values, the system can move the, now heated, molted salt to the hot molten salt tank. In addition, the system can move cold briny fluid into the injection well and pump hot briny fluid into the heat exchanger. For example, the threshold value for molten salt to move into the hot molten salt tank can be 300° C. Once the temperature sensor detects that the molten salt has reached 300° C., the temperature sensor can provide an indication to move the hot molten salt into the hot molten salt tank 7 and to let cold molten salt into the briny fluid to molten salt heat exchanger 10.

After the heat is extracted from the briny fluid that entered the briny fluid to molten salt heat exchanger 10, the briny fluid may get reinjected back into the resource. So far, the briny fluid came up, transfers heat to molten salt or rock bed, and is reinjected into the geothermal resource. In one embodiment, the cold molten salt from the cold molten salt storage tank 8 entered the heat exchanger 10, is heated, and then pumped to the hot molten salt storage tank 7. In an embodiment, the heated molten salt is used to heat thermal fluids such as, for example, thermal oil and water. Now the molten salt may be ready to go through the molten salt to distilled water heat exchanger.

Hot molten salt may enter the molten salt to distilled water heat exchanger 20 via a third pipe 9. The steam produced from the molten salt to distilled water heat exchanger 20 may be then routed to a steam turbine 50 or GenSet via a fourth pipe 21 to produce electricity.

The steam may go through a condenser/cooling tower 23 to turn into water, so it can then repeat the molten salt to distilled water loop. The steam may be routed through a fifth pipe 17 to Molten Salt to Thermal Oil Heat Exchanger 30, through a sixth pipe 18, to Molten Salt to Hot Water Heat Exchanger 40, and back to cold molten salt storage tank 8 where it waits to be reheated by hot briny fluid.

The steam may be routed to thermal oil storage tank 32 via a seventh pipe 31 and routed to Cooled Thermal Oil Storage Tank 34 via an eighth pipe 33. The cooled thermal oil may be routed to Cooled Thermal Oil to Cold Thermal Oil Storage Tank 36 via a ninth pipe 35.

From the molten salt to hot water heat exchanger 40, hot water may be routed to hot water storage tank 42 via a tenth pipe 41. The hot water may be routed from hot water storage tank 42 to hot water system 44 via an eleventh pipe 43. Cooled water may be routed to cold water storage tank 46 via a twelfth pipe 45. The cooled water may route back to molten salt to hot water heat exchanger 40 via a thirteenth pipe 47.

The steam turbine 50 may rotate a rotor 51, which allows for a generator 52 to provide electrical energy, where a transformer 53 transform electrical energy and facilitate the transmission of three phase electricity 55 to the grid.

In an embodiment, the energy collection system can include a molten silicon heat exchanger 62. Electrodes (e.g., using electricity produced by the geothermal power plant) can be heated up in molten silicon storage tank 60 to up to 2000° C. The molten silicon can be used in a heat exchanger 62 with molten salt to get the molten salt up to a higher working temperature like 1000° C. In an embodiment, molten glass can be used in the heat sink. Molten glass can be heated to up to 1200° C. by the electrodes. The molten salt may be sent back to hot molten salt storage 7 via return pipes 64, 65.

Figure 2:
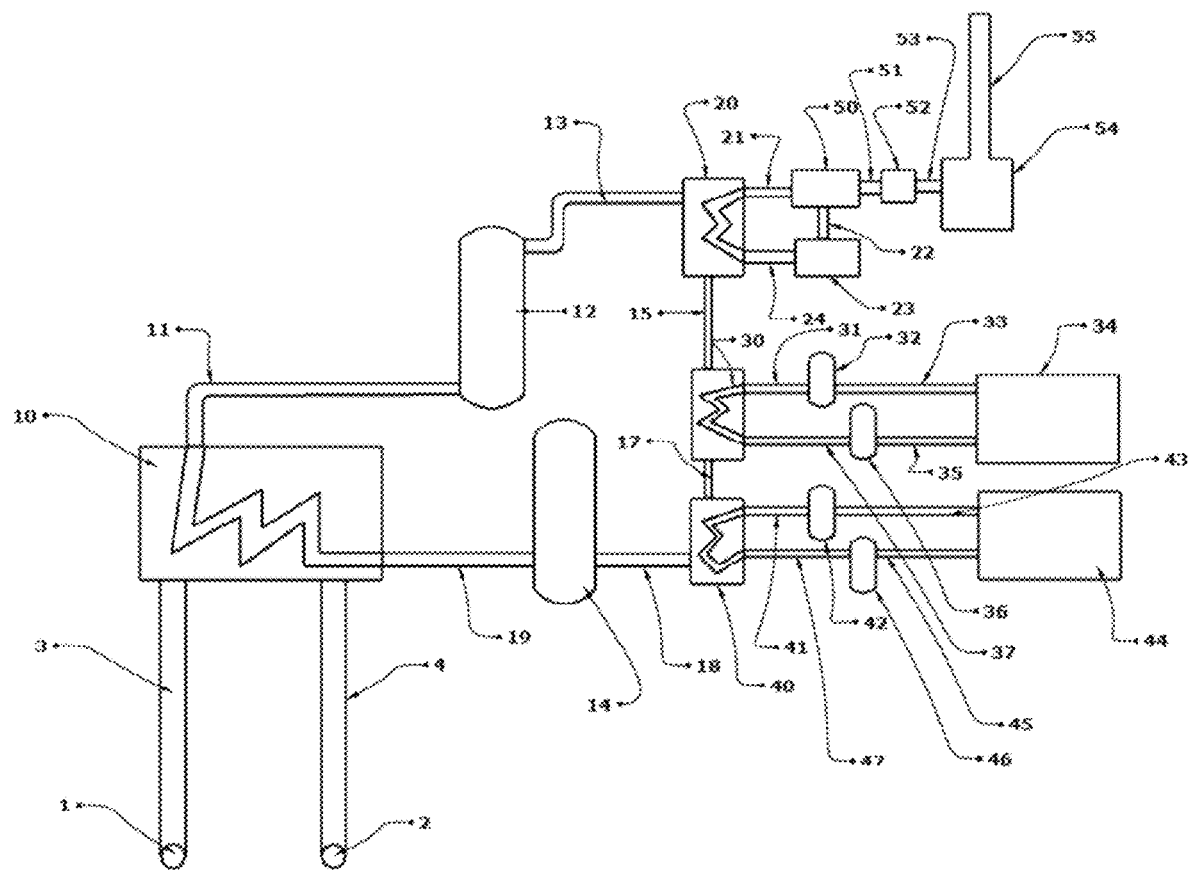
FIG. 2 illustrates a block diagram of a briny fluid to molten salt heat extraction system, in accordance with various embodiments.

FIG. 2 illustrates a block diagram of a briny fluid to molten salt heat extraction system, in accordance with various embodiments. The embodiment as shown in FIG. 2 may include a briny fluid to molten salt heat extraction system different thermal fluid loops such as, for example, thermal oil and hot water loops. By using different thermal fluids, the system can have a wide range of applications and can increase efficiency. Closed-loop thermal oil heat exchangers and closed loop hot water heat exchangers can be incorporated into the system to serve heat processes that utilize various temperatures ranges. For example, thermal oil can be circulated, through thermal ovens, in the molten salt to water heat exchanger. By circulating thermal oil, the amount of steam produced can be maximized.

Hot Briny fluid may be gathered from production well 1 and transferred to briny fluid to molten salt heat exchanger 10 via a first pipe 2. Hot molten salt from briny fluid to molten salt heat exchanger 10 may be sent to hot molten salt storage 7 via a second pipe 5. Cold molten salt may be transferred between cold molten salt storage 8 and briny fluid to molten salt heat exchanger 10 via a third pipe 6.

Molten salt may be transferred to molten salt to hot water for steam heat exchanger 20 via a fourth pipe 9. Molten Salt to Hot Water for Steam Heat Exchanger 20 may power Steam Turbine 50 via fifth pipe 21. Steam turbine 50 may power rotor 51, generator 52, transformer 53, and three phase electricity to grid 54.

Cooled steam may transfer from steam turbine 50 to Condenser or Cooling Tower 23 via sixth pipe 22 and back to Molten Salt to Hot Water for Steam Heat Exchanger 20 via a seventh pipe 24. Molten salt may transfer from Molten Salt to Steam Heat Exchanger 20 to Molten Salt to Thermal Oil Heat Exchanger 30 via eighth pipe 25.

Thermal oil may transfer between Molten Salt to Thermal Oil Heat Exchanger 30 and Thermal Oil Storage Tank 32 via a ninth pipe 31. The thermal oil may transfer between Thermal Oil Storage Tank 32 and Thermal Oil System 34 via a tenth pipe 33. Cooled thermal oil may transfer from Thermal Oil System 34 to Cooled Thermal Oil Storage Tank 36 via eleventh pipe 35. Cooled thermal oil may transfer from Cooled Thermal Oil Storage Tank 36 back to Molten Salt to Thermal Oil Heat Exchanger 30 via twelfth pipe 37.

Molten salt may transfer between Molten Salt to Thermal Oil Heat Exchanger 30 and Molten Salt to Hot Water Heat Exchanger 40 via thirteenth pipe 38. Hot water may transfer between Molten Salt to Hot Water Heat Exchanger 40 and Hot Water Storage Tank 42 via fourteenth pipe 41. Hot water may transfer between Hot Water Storage Tank 42 and Hot Water System 44 via fifteenth pipe 43. Water may transfer between Hot Water System 44 and Cold Water Storage Tank 46 via sixteenth pipe 45. Water may transfer between Cold Water Storage Tank 46 and Molten Salt to Hot Water Heat Exchanger 40 via eighteenth pipe 47.

Figure 3:
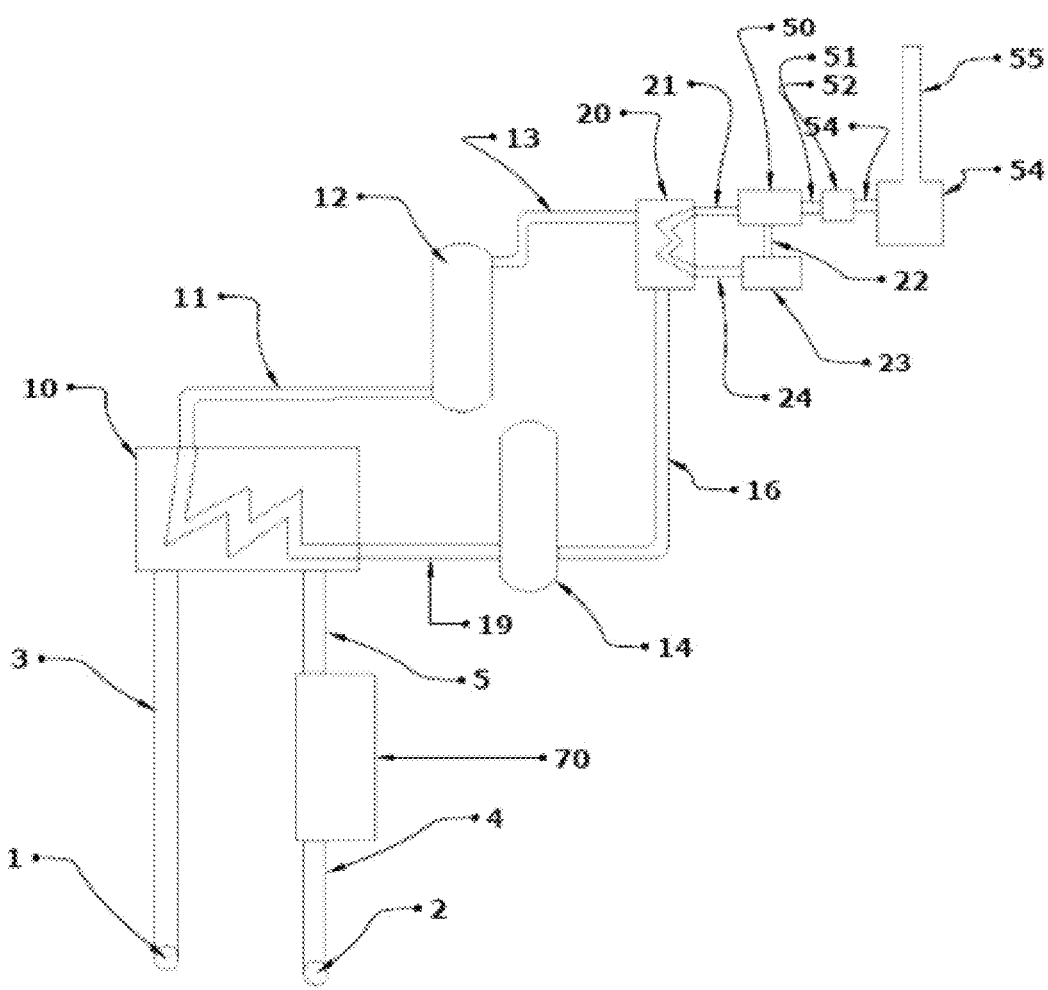
FIG. 3 illustrates a block diagram of a molten salt geothermal system with lithium extraction, in accordance with various embodiments.

FIG. 3 illustrates a block diagram of a molten salt geothermal system with lithium extraction, in accordance with various embodiments. In an embodiment, the energy collection system is used to extract lithium from the briny fluid. After the briny fluid goes through the briny fluid to molten salt heat exchanger and before it gets injected back into the resource, the briny fluid may go through the lithium extraction process.

As shown in FIG. 3, hot briny fluid may be sent from a production well 1 to a Briny Fluid to Molten Salt Heat Exchanger 10 via a first pipe 3. Cold molten salt may be stored in Cold Molten Salt Storage 14 and transferred to Briny Fluid to Molten Salt Heat Exchanger 10 via a second pipe 19. Hot molten salt may transfer from Briny Fluid to Molten Salt Heat Exchanger 10 to Hot Molten Salt Storage 12 via a third pipe 11. Hot molten salt may transfer from Hot Molten Salt Storage 12 to Molten Salt to Hot Water for Steam Heat Exchanger 20 via a fourth pipe 13.

The Molten Salt to Hot Water for Steam Heat Exchanger 20 may generate steam for steam turbine 50. The steam turbine 50 may rotate a rotor 51, which allows for a generator 52 to provide electrical energy, where a transformer 54 transform electrical energy and facilitate the transmission of three phase electricity 55 to the grid. Steam may transfer from steam turbine 50 to condenser/cooling tower 23 via a fifth pipe 22, and from condenser/cooling tower 23 to Molten Salt to Hot Water for Steam Heat Exchanger 20 via a sixth pipe 24. Molten salt may travel from Molten Salt to Hot Water for Steam Heat Exchanger 20 to cold molten salt storage tank 14 via a seventh pipe 16.

Briny fluid from Briny Fluid to Molten Salt Heat Exchanger 10 may transfer to Lithium Extractor 70 via an eighth pipe 5. From the Lithium Extractor 70, Briny Fluid may transfer to injection well 2 via a ninth pipe 4.

In an embodiment, the energy collection system includes a magnetic lithium extractor configured to maintain a pressure of the closed-loop system. Although lithium can respond to a magnetic force independently, lithium's response is relatively small compared to other metals. To increase lithium's magnetic response, and thus increase magnetic extraction, a dopant can be injected into the briny fluid. For example, the magnetic lithium extractor can inject iron into the briny fluid. Lithium is highly reactive and can form an iron-doped compound (e.g., iron-doped lithium oxide, iron-doped lithium titanium oxide, etc.). The lithium compound can vary based on constituents of the briny fluid. A magnet can exert an attractive force on the iron-doped lithium compound to draw the iron-doped lithium compound toward an extraction well.

The extraction well can include two doors. During magnetic lithium collection, a closed-loop facing door can remain open and an outward facing door can remain closed. Once magnetic collection is complete, the closed-loop facing door closes to seal the iron-doped lithium within the extraction well. Once the closed-loop facing door closes, the outward facing door can open so that the collected iron-doped lithium can be processed and purified. Since the closed-loop facing door and outward facing door are not open at the same time, pressure within the closed-loop system remains substantially constant.

One system can transfer heat from briny fluid to molten salt and from molten salt to steam and steam to electricity. Another system can add a molten silicon or molten glass heat sink. Another system adds thermal oil and hot water loops. Another system can add lithium extraction before the briny fluid is reinjected. The heat transfer from briny fluid to molten salt and from molten salt to steam and steam to electricity, the molten silicon or molten glass heat sink, thermal oil and hot water loops, and lithium extraction can occur simultaneously, one at a time, or any combination thereof.

Figure 4:
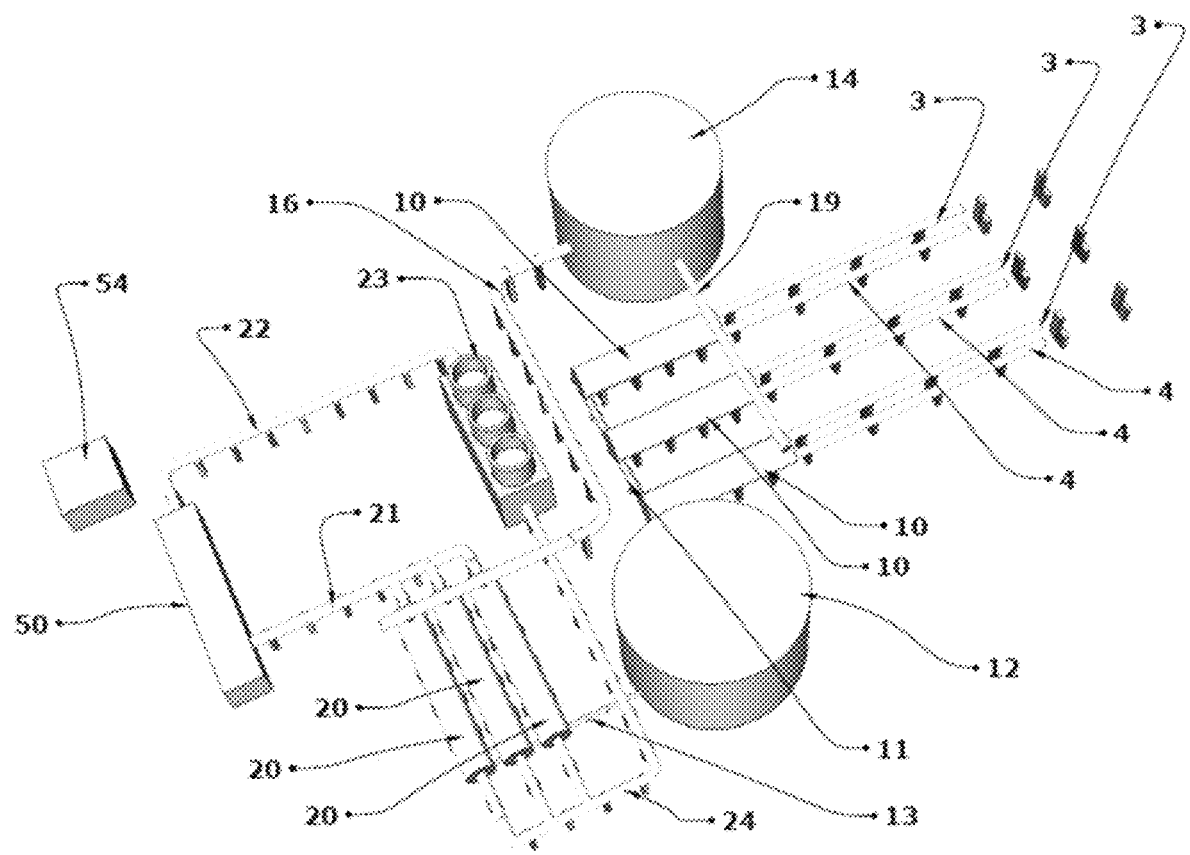
FIG. 4 illustrates a block diagram of an energy collection system, in accordance with various embodiments.

FIG. 4 illustrates a block diagram of an energy collection system, in accordance with various embodiments. As illustrated in FIG. 4, the energy collection system can include one or more Briny Fluid from Well to Briny Fluid/Molten Salt Heat Exchangers 3 that are sent to Briny Fluid to Molten Salt Heat Exchanger 10 via a first pipe 4. Hot molten salt may transfer between Briny Fluid to Molten Salt Heat Exchanger 10 and Hot MS Storage Tank 12 via a second pipe 11. Cold molten salt may transfer between Briny Fluid to Molten Salt Heat Exchanger 10 and cold molten salt storage tank 14 via a third pipe 19. Molten salt may transfer between Hot MS Storage tank 12 and Molten Salt/Hot Water for Steam Heat Exchanger 20 via a fourth pipe 13.

Hot water may transfer from Molten Salt/Hot Water for Steam Heat Exchanger 20 and GenSet via fifth pipe 21. GenSet 50 may power transformer 54. Water from Steam Turbine may be sent to Condensers or Cooling Towers 23 via a sixth pipe 22 and back to Molten Salt/Hot Water for Steam Heat Exchanger 20 via seventh pipe 24. Cold molten salt may be sent back to cold MS storage tank 14 via eighth pipe 16.

In an embodiment, the energy collection system can include a thermal vacuum chamber (TVC). A TVC is a vacuum chamber in which a radiative thermal environment is controlled. A controlled environment is created by removing air and other gases by a vacuum pump. By removing the air and other gases, a low-pressure and temperature-controlled environment is created within the chamber an efficient heat transfer mechanism.

Figure 5:
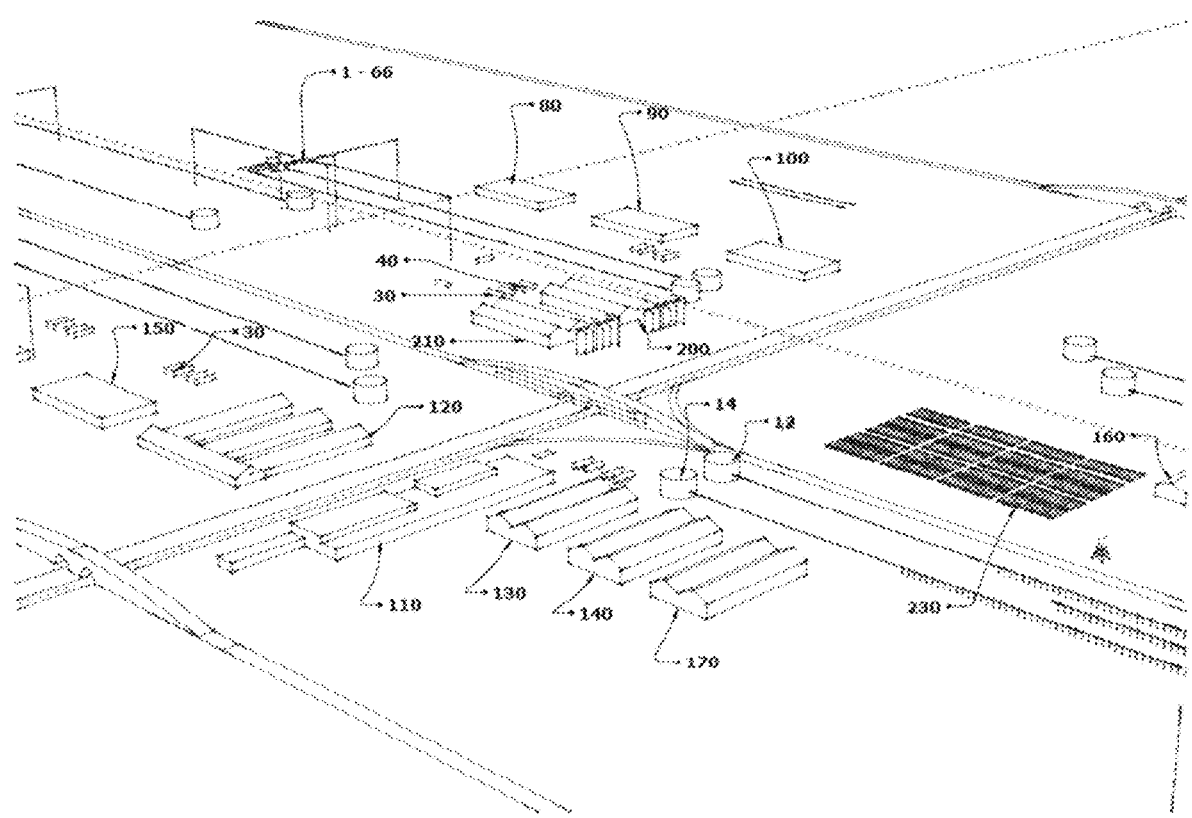
FIG. 5 illustrates an isometric view of a briny fluid to molten salt geothermal heat energy extraction system, in accordance with various embodiments.

FIG. 5 illustrates an isometric view of a briny fluid to molten salt geothermal heat energy extraction system, in accordance with various embodiments. The energy extraction system can include a production well, a briny fluid to molten salt heat exchanger, one or more molten salt tanks, and an injection well.

A closed-loop briny fluid system may extend from the production well, through the fluid to molten salt heat exchanger, and through the injection well. Briny fluid traveling through the closed-loop fluid system maintains an approximately constant pressure (e.g., approximately the pressure at a depth from which it is extracted). The closed-loop briny fluid system includes a number of pumps to direct the briny fluid through the system and to maintain a constant pressure. Since the pressure at the top of the closed-loop system is approximately equal to the pressure with the geothermal source, pumps can be used to induce briny fluid movement through the closed-loop system.

Velocity control valves and pumps maintain a substantially constant pressure between the top of the close-loop system and the geothermal source. Velocity control valves and pumps can be regulated by sensors within the system, as mentioned before. For example, sensors can be placed at the top of the closed-loop system and in the geothermal source. If the sensors detect a variation in pressure, the velocity control valves and pump can be used to match the pressure. In addition, the velocity control valves and pumps can be controlled simultaneously or separately, based on need.

The production well can be constructed in a pre-drilled well (e.g., from earlier fossil fuel extraction) or drilled at a new site. A conventional drilling technique can be used to drill the well such as, for example, reverse circulation drilling, diamond core drilling, direct push drilling, hydraulic rotary drilling, hydrothermal spallation, or any combination thereof. After a well is drilled, a casing (e.g., a titanium alloy casing) can be cemented in place by pumping cement into an annulus (e.g., the region between the casing and surrounding rock formation). The casing can include titanium alloy to reduce corrosion from particularly corrosive briny fluid. The casing and cement of the production can prevent the production well from expanding or buckling when under pressure from the high-pressure briny fluid. The casing can extend from the production zone of the geothermal source to the surface of the ground.

The production well is used to extract briny fluid heated by the natural heat of the earth. Geothermal fluids may include hot water with a total dissolved solid concentration exceeding 350,000 parts per million (about an order of magnitude above sea water). Conventional extraction techniques involve using the pressure differential between a geothermal source and ground level to extract geothermal fluids which can cause the hot water to turn to steam as it reaches ground level. Since the disclosed technique employs a closed-loop system with approximately consistent pressure, the hot water can remain hot water without turning to steam. The production well can include a pump located near ground level to extract briny fluid from the geothermal source.

The one or more molten salt tanks can store "cold" molten salt (i.e., molten salt prior to entering heat exchanger) and "hot" molten salt (i.e., molten salt after exiting heat exchanger). In an embodiment, a single molten salt tank with a divider plate can be used between cold molten salt storage and hot molten salt. The divider plate can include a non-thermally conductive material, such as, for example, manganese, basalt fiber, or basalt coatings. For example, the divider plate can include a first manganese layer, an air gap, and a second manganese layer.

In an embodiment, separate molten salt tanks can be used to store the cold and hot molten salt separately. Walls of the storage containers can include a substantially non-thermally conductive material such as, for example, manganese, basalt fiber, or basalt coatings. The storage containers can include an insulation layer sandwiched between one or more other layers. The insulation layer can include, for example, a gas (e.g., air), ceramic fiber, mineral wool, or any combination thereof.

Briny fluid cooled after exiting the heat exchanger can be injected back into the geothermal formation via the injection well. Injecting the briny fluid back into the geothermal formation can help to maintain reservoir pressure and ensure that the heat energy resource is not depleted. An injection well can be formed using techniques analogous to those used for the production well. The injection well can include one or more pumps to direct the briny fluid down into the geothermal formation. Since the pressure of the briny fluid is approximately equal to the geothermal formation, the energy required to pump the fluid back down into the formation may be significantly less than for conventional techniques.

The system as described herein may be shown in FIG. 5. As shown in FIG. 5, the complex may include any of Silicon Carbide/Boron Carbide Plant 80, Steel Forge/Metal Recycling/Glass Recycling 90, Basalt Fiber Plant 100, Ceramics Plant 110, Brick Plant 120, Tile Plant 130, Isoprene Plant 140, Desalination Plant 150, Pyrolysis Plant for Waste Recycling and Algae to BioOil 160, Textiles Plant 170, Automobile Kiln for Drying Paint 180, Dehydrating Plant 190, Food Processing Plant 200, Bakery 210, Cold Storage Facility/Ice Manufacturing 220, Algae Farm 230, Tilapia Farm 240, Beverage Manufacturing Plant 250.

Figure 6:
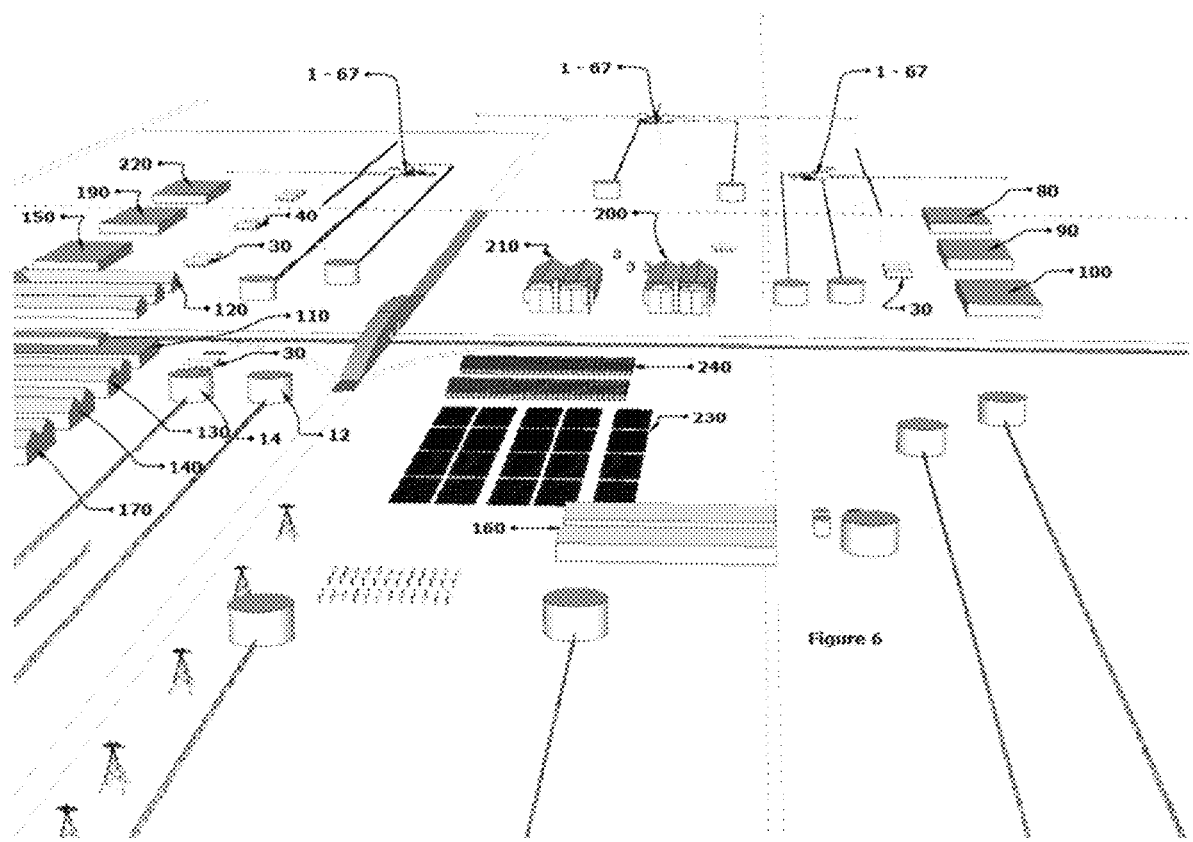
FIG. 6 is an isometric view of an industrial complex powered substantially by geothermal energy, in accordance with various embodiments.

FIG. 6 is an isometric view of an industrial complex powered substantially by geothermal energy, in accordance with various embodiments. The geothermal energy can provide energy to, for example, steam generators. The industrial complex also includes a closed-loop molten salt distribution system. The industrial complex can include components such as, for example, a production well, injection well, briny fluid to molten salt heat exchanger, and molten salt to water heat exchanger. In addition, substantially all energy required to power the industrial complex can be made within the complex. For example, the energy generated by the steam generators can be used to power the infrastructure of the complex (e.g., lighting, temperature control).

In one embodiment, in order to maximize energy production and efficiency of the industrial complex, sand, fire brick and ferro alloy materials can be incorporated into the building materials of the complex. For example, heat exchangers can be made of ferro alloy materials, piping can be insulated by sand or any element (e.g., pipes) running along or underneath the ground can be surrounded by fire brick.

The system as described herein may be shown in FIG. 6 to deliver salt to end user in pipes 66, 67. As shown in FIG. 6, the complex may include any of Silicon Carbide/Boron Carbide Plant 80, Steel Forge/Metal Recycling/Glass Recycling 90, Basalt Fiber Plant 100, Ceramics Plant 110, Brick Plant 120, Tile Plant 130, Isoprene Plant 140, Desalination Plant 150, Pyrolysis Plant for Waste Recycling and Algae to BioOil 160, Textiles Plant 170, Automobile Kiln for Drying Paint 180, Dehydrating Plant 190, Food Processing Plant 200, Bakery 210, Cold Storage Facility/Ice Manufacturing 220, Algae Farm 230, Tilapia Farm 240.

Figure 7:
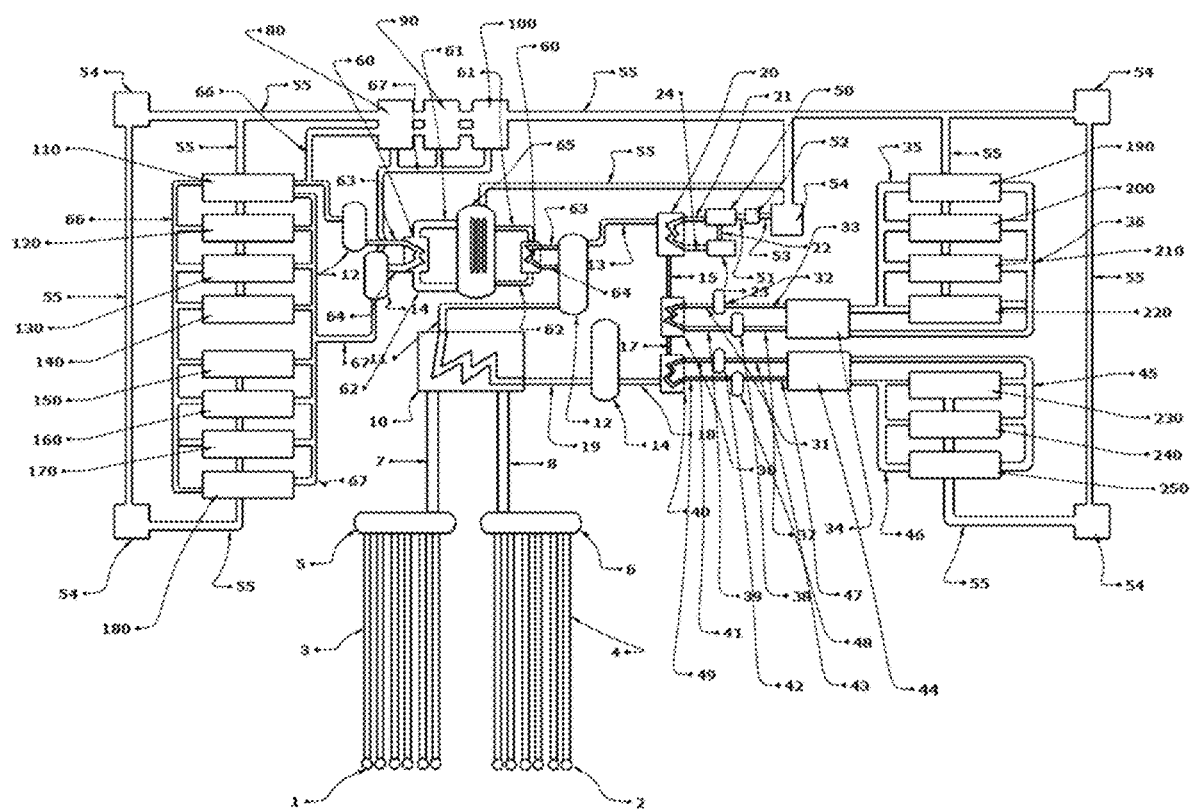
FIG. 7 illustrates a block diagram of a system to extract energy from geothermal briny fluids, in accordance with various embodiments.

FIG. 7 illustrates a block diagram of a system to extract energy from geothermal briny fluids, in accordance with various embodiments. A briny fluid may be extracted from Production Well 1 and Briny Fluid Manifold with Six Production Wells 5 via Briny Fluid from Well to Manifold pipe 3. Briny fluid is sent from Briny Fluid Manifold with Six Production Wells 5 to Briny Fluid to Molten Salt Heat Exchanger 10 via Briny Fluid Inlet Pipe to Briny Fluid Molten Salt Heat Exchanger 7. Hot Briny fluid is sent from Briny Fluid to Molten Salt Heat Exchanger 10 to Hot MS Storage Tank 12 via Pipe from Briny Fluid to MS Heat Exchanger to Hot MS Storage 11. Hot Molten salt is sent from Hot MS Storage Tank 12 to Molten Salt/Hot Water for Steam Heat Exchanger 20 via Hot MS Storage Pipe to MS/Hot Water for Steam Heat Exchanger 13.

Hot water may transfer from Molten Salt/Hot Water for Steam Heat Exchanger 20 to GenSet 50 via Steam Pipe to GenSet 21. Genset 50 may power Rotor 51 and Generator 52 and provide Electricity 53 to Transformer 54 and to Conduit with High Voltage to Transformers and End Users 55.

Conduit 55 may provide power to any of Silicon Carbide/Boron Carbide Plant 80, Steel Forge/Metal Recycling/Glass Recycling 90, Basalt Fiber Plant 100, Ceramics Plant 110, Brick Plant 120, Tile Plant 130, Isoprene Plant 140, Desalination Plant 150, Pyrolysis Plant for Waste Recycling and Algae to BioOil 160, Textiles Plant 170, Automobile Kiln for Drying Paint 180, Dehydrating Plant 190, Food Processing Plant 200, Bakery 210, Cold Storage Facility/Ice Manufacturing 220, Algae Farm 230, Tilapia Farm 240, and Beverage Manufacturing Plant 250.

Hot water may be sent from Genset 50 to Condensers or Cooling Towers 23 via Pipe carrying Hot Water from Steam Turbine to Condensers or Cooling Towers 22. Cold water may be sent from Condensers or Cooling Towers 23 to Molten Salt/Hot Water for Steam Heat Exchanger 20 via Cold Water Return to MS/Hot Water for Steam Heat Exchanger 24.

Molten salt may be sent from Molten Salt/Hot Water for Steam Heat Exchanger 20 to MS/Thermal Oil Heat Exchanger 30 via Pipe from MS to Steam Heat Ex. to Thermal Oil Heat Ex. 15. Thermal oil may be sent from MS/Thermal Oil Heat Exchanger 30 to Hot Thermal Oil Storage Tank 32 via Pipe Hot Thermal Oil to Hot Thermal Oil Storage Tank 31, and from Hot Thermal Oil Storage Tank 32 to Thermal Oil System 34 via Pipe from Hot Thermal Oil Storage Tank to Thermal Oil System 33, and from Thermal Oil System 34 to Hot Thermal Oil to End Users 35. Thermal Oil is sent to Cold Thermal Oil Storage 38 via Cold Thermal Oil Return Pipe 36 and Return Pipe Thermal Oil System to Cold Thermal Oil Storage 37. Thermal Oil may be sent to MS/Hot Water Heat Exchanger 40 via Return Pipe Cold Thermal Oil Storage to MS/Thermal Oil Heat X 39.

Hot water may be sent from MS/Hot Water Heat Exchanger 40 to Hot Water Storage Tank 42 via Pipe from MS/Hot Water to Hot Water Storage Tank 41, and to Hot Water System 44 via Pipe from Hot Water Storage Tank to Hot Water System 43. Water may be sent via Pipe Hot Water from System to End Users 45 and be returned via Return Water from End Users to Hot Water System 46. Cold water may be sent to Cold Water Storage 48 via Cold Water Return Pipe to Cold Water Storage 47, and to MS/Hot Water Heat Exchanger 40 via Return Pipe from Cold Water Storage to MS/Hot Water Heat X 49.

Molten silicon may be sent from Molten Silicon to Molten Salt Heat Exchanger 60 to Molten Si Return Pipe to Molten Si Storage 62 via Pipe from Molten Si Storage to Molten Si/Molten Salt Heat X 61. Molten salt may be sent to Hot Molten Salt Pipe to Molten Si/Molten Salt Heat Exchanger 63 to Cold MS Return Pipe from End Users to Molten Salt/MSi Heat X 64. The system may include Molten Silicon Storage with Heating Electrodes 65, where hot molten salt is sent via Hot Molten Salt Distribution Pipe to End Users 66 and returned via Cold Molten Salt Return Pipe from End Users 67.

Cold molten salt may be stored at Cold Molten Salt Storage Tank 14. Molten salt may be sent via Pipe from MS/Thermal Oil Heat Ex. to MS/Hot Water Heat Ex. 17 and Cold MS Pipe from MS/Water Heat Ex. to Cold MS Storage 18 and returned to Briny Fluid to Molten Salt Heat Exchanger 10 via Return Pipe Cold MS Storage to Briny Fluid/MS Heat Exchanger 19. Briny fluid can be sent to Briny Fluid Manifold with Six Injection Wells 6 via Pipe from Briny Fluid MS Heat Exchanger to Injection Manifold 8, and to Injection Well 2 via Briny Fluid from Manifold to Injection Well 4.

Figure 8:
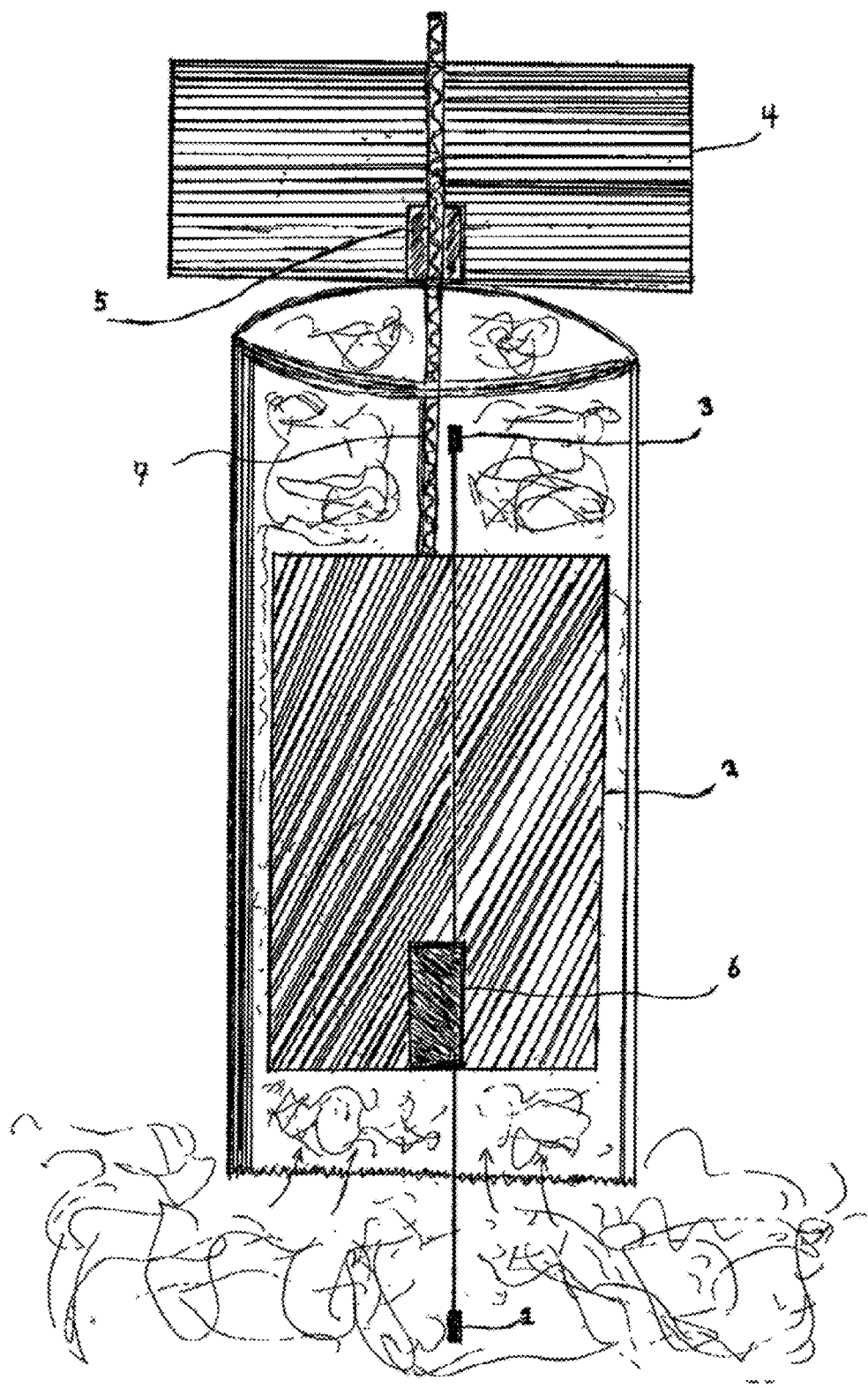
FIG. 8 illustrates a block diagram of a geothermal heat extraction management system, in accordance with various embodiments.

FIG. 8 illustrates a block diagram of a geothermal heat extraction management system, in accordance with various embodiments. As shown in FIG. 8, the system may include a first pressure sensor 1 configured to detect a first pressure disposed within a geothermal source. The system may include a pump 2 disposed within the extraction well and a second pressure sensor 3 disposed within the extraction well to detect a second pressure. The system may include a Heat exchanger 4 configured to transfer heat between briny fluid and molten salt. The system may include a processor 5 connected to pump and heat exchanger. The processor 5 may be configured to analyze the difference in pressure readings between the first pressure sensor and the second pressure sensor and instruct the pump to adjust a first pressure within the extraction well to match a second pressure within the geothermal source by increasing or decreasing a flow rate of the briny fluid inside the extraction well.

The system may include a pressure sensor 6 to attach to both first and second pressure sensors 1, 3 and a raising and lowering suspension cable 7 for the pump and sensors and an Electrical cable 8 for the pump.

Figure 9:
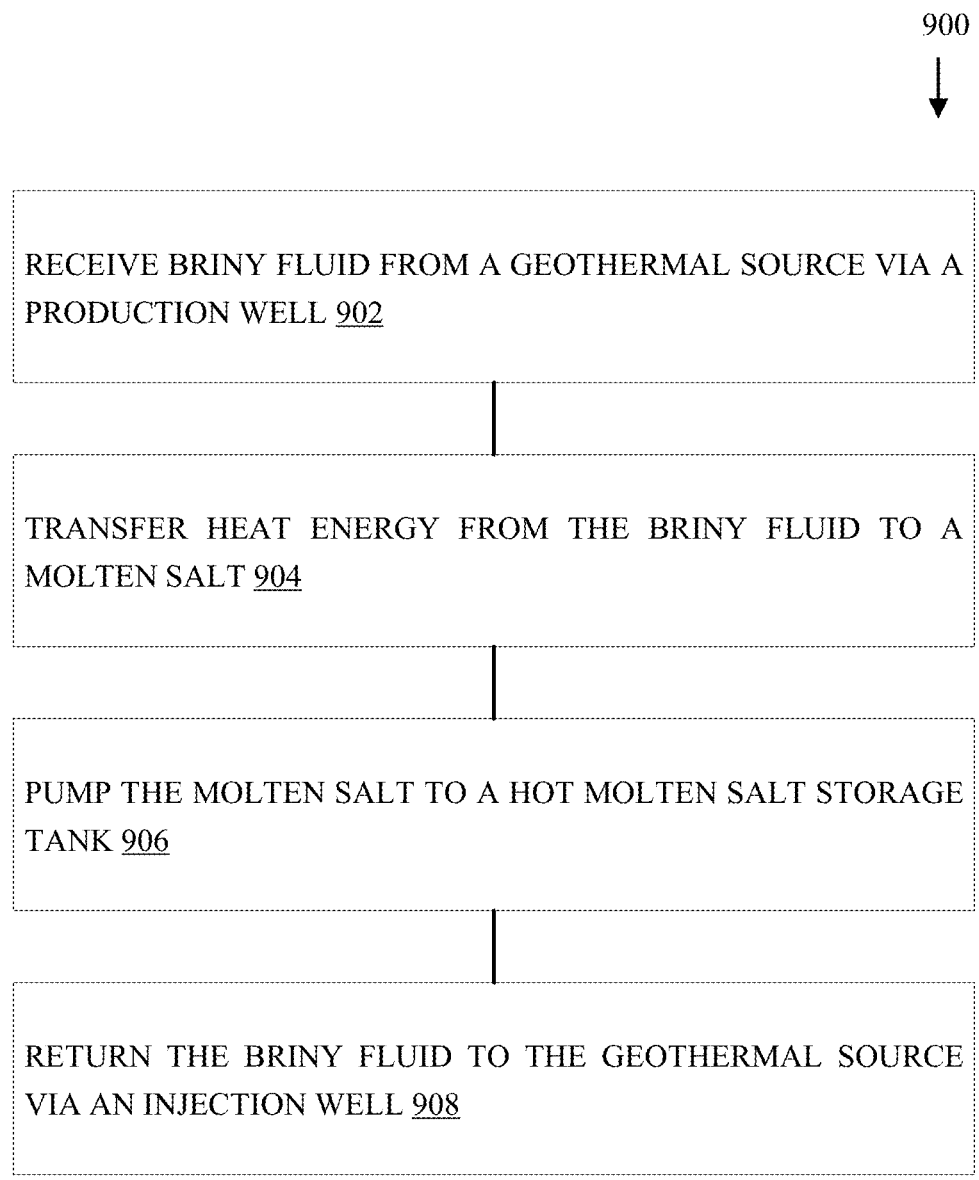
FIG. 9 is a block diagram illustrating a method for collecting heat energy from a briny fluid, in accordance with various embodiments.

FIG. 9 is a block diagram illustrating a method for collecting heat energy from a briny fluid, in accordance with various embodiments. The method may include receiving, by a first set of heat exchangers, the briny fluid from geothermal source via a production well (block 902).

The method may include transferring, by the first set of heat exchangers, heat energy from the briny fluid to a molten salt, wherein the briny fluid remains in a closed-loop system apart from the molten salt (block 904).

The method may include pumping the molten salt to a hot molten salt storage tank (block 906).

The method may include returning the briny fluid to the geothermal source via an injection well (block 908).

In some embodiments, the method includes transferring the molten salt from the hot molten salt storage tank to a second set of heat exchangers configured to power a steam turbine.

In some embodiments the molten salt causes water to turn to steam via the second set of heat exchangers, wherein the steam causes the turbine to rotate.

In some embodiments the steam is directed to a condenser and cooling tower.

In some embodiments the steam is condensed and redirected back to the turbine as water to receive heat energy from the second set of heat exchangers.

In some embodiments the molten salt heated by the transferred heat energy from the briny fluid is delivered to one or more regions in an industrial park.

In some embodiments the molten salt, subsequent to releasing heat energy to the industrial park, is delivered back to the first set of heat exchangers to cause the molten salt to repeat the transferring of heat energy from the briny fluid to the molten salt.

In some embodiments, the first set of heat exchangers control a velocity of the briny fluid.

In some embodiments, the briny fluid includes a temperature between approximately 195° C. and 800° C.

In some embodiments, the molten salt flow rate is controlled by velocity control valves and pumps.

In some embodiments, the molten salt flow rate is monitored by sensors, which provide feedback to the velocity control valves and pumps, which then maintain a maintained pressure approximately equivalent to a pressure inside of the geothermal source.

In some embodiments, the molten salt is mixed with nano-particles.

In some embodiments, the molten salt and the briny fluid are separated by a basalt-based partition.

In another embodiment, a method for collecting heat energy from a briny fluid includes receiving, by a first set of heat exchangers, the briny fluid from a production well. The method may also include transferring, by the first set of heat exchangers, heat energy from the briny fluid to a molten salt, wherein the briny fluid remains in a first closed-loop system apart from the molten salt. The method may also include pumping the molten salt to a hot molten salt storage tank. The method may also include transferring, by a second set of heat exchangers, heat energy from the molten salt to a thermal fluid, wherein the molten salt remains in a second closed-loop system apart from the thermal fluid. The method may also include returning the briny fluid to a geothermal source via an injection well.

In some embodiments, the second set of heat exchangers exchange heat energy from the molten salt to thermal oil.

In some embodiments, the second set of heat exchangers exchange heat energy from the molten salt to water. a maintained pressure approximately equivalent to a pressure inside of the geothermal source is maintained by velocity control valves and pumps.

In some embodiments, the maintained pressure is read by sensors, which provide feedback to the velocity control valves and pumps.

In another embodiment, a method for collecting heat energy from a briny fluid includes receiving, by a first set of heat exchangers, the briny fluid from a production well. The method may also include transferring, by the first set of heat exchangers, heat energy from the briny fluid to a molten salt, wherein the briny fluid remains in a first closed-loop system apart from the molten salt. The method may also include pumping the molten salt to a hot molten salt storage tank. The method may also include transferring, by a second set of heat exchangers, heat energy from the molten salt to a molten silicon or a molten glass, wherein the molten salt remains in a second closed-loop system apart from the molten silicon or the molten glass. The method may also include returning the briny fluid to a geothermal source via an injection well.

In some embodiments, the second set of heat exchangers, include electrodes which use energy created within the second closed-loop system.

In some embodiments, wherein a maintained pressure approximately equivalent to a pressure inside of the geothermal source is maintained by velocity control valves and pumps.

In some embodiments, the maintained pressure is read by sensors, which provide feedback to the velocity control valves and pumps.

In some embodiments, the method includes transferring, by the second set of heat exchangers, heat energy from the molten salt to electrical energy, wherein said transferring heat energy from the molten salt to the molten silicon or a molten glass includes heating the molten silicon or the molten glass using an electrical resistance coil that includes the electrical energy.

In some embodiments, a state of the molten silicon or molten glass includes a liquid or a solid, and wherein any of the molten silicon or molten glass is mixed with nano-particles.

In another embodiment, a geothermal heat collection apparatus comprises a heat exchanger configured to transfer heat energy between a briny fluid and a molten salt, the briny fluid being drawn from a geothermal aquifer via a production well, wherein the briny fluid remains in a closed-loop system apart from the molten salt, the closed-loop system extending from the production well to an injection well. The apparatus may also include a molten salt storage tank configured to receive the molten salt heated by the heat exchanger. The apparatus may also include the injection well configured to return the briny fluid to the geothermal aquifer, wherein the closed-loop system maintains an approximately constant pressure from the production well to the injection well.

In another embodiment, a geothermal heat extraction management system comprises a pump disposed within an extraction well. The system may also include a first pressure sensor disposed within a geothermal source. The system may also include a second pressure sensor disposed within the extraction well. The system may also include a heat exchanger configured to transfer heat energy between briny fluid and molten salt. The system may also include a processor connected to the pump and the heat exchanger, the processor configured to analyze the difference in pressure readings between the first pressure sensor and the second pressure sensor, instruct the pump to adjust a first pressure within the extraction well to match a second pressure within the geothermal source by increasing or decreasing a flow rate of the briny fluid inside the extraction well.

In addition to the above-mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A method for collecting heat energy from a briny fluid, the method comprising:
   receiving, by a first set of heat exchangers, the briny fluid from geothermal source via a production well;
   transferring, by the first set of heat exchangers, heat energy from the briny fluid to a molten salt, wherein the briny fluid remains in a closed-loop system apart from the molten salt;
   pumping the molten salt to a hot molten salt storage tank; and
   returning the briny fluid to the geothermal source via an injection well;
   wherein a molten salt flow rate is controlled by velocity control valves and pumps, and
   wherein the molten salt flow rate is monitored by sensors, which provide feedback to the velocity control valves and pumps, which then maintain a maintained pressure approximately equivalent to a pressure inside of the geothermal source.

2. The method of claim 1, further comprising:
   transferring the molten salt from the hot molten salt storage tank to a second set of heat exchangers configured to power a steam turbine.

3. The method of claim 2, wherein the molten salt causes water to turn to steam via the second set of heat exchangers, wherein the steam causes the turbine to rotate.

4. The method of claim 3, wherein the steam is directed to a condenser that is cooled by a cooling tower.

5. The method of claim 3, wherein the steam is condensed and redirected back to the turbine as water to receive heat energy from the second set of heat exchangers.

6. The method of claim 1, wherein the molten salt heated by the transferred heat energy from the briny fluid is delivered to one or more regions in an industrial park.

7. The method of claim 6, wherein the molten salt, subsequent to releasing heat energy to the industrial park, is delivered back to the first set of heat exchangers to cause the molten salt to repeat the transferring of heat energy from the briny fluid to the molten salt.

8. The method of claim 1, wherein the briny fluid includes a temperature between approximately 175° C. and 800° C.

9. The method of claim 1, wherein the molten salt is mixed with nano-particles.

10. The method of claim 1, wherein the molten salt and the briny fluid are separated by a basalt-based partition.

11. The method of claim 1, further comprising:
    transferring the molten salt from the hot molten salt storage tank to a second set of heat exchangers configured to power a remote electric generating unit.

12. The method of claim 1, wherein the molten salt is comprised of sodium nitrate, potassium nitrate, and calcium nitrate.

13. The method of claim 9, wherein the nano-particles are comprised of copper encrusted graphite and graphene.

14. A method for collecting heat energy from a briny fluid, the method comprising:
    receiving, by a first set of heat exchangers, the briny fluid from a production well;
    transferring, by the first set of heat exchangers, heat energy from the briny fluid to a molten salt, wherein the briny fluid remains in a first closed-loop system apart from the molten salt;
    pumping the molten salt to a hot molten salt storage tank;
    transferring, by a second set of heat exchangers, heat energy from the molten salt to a thermal fluid, wherein the molten salt remains in a second closed-loop system apart from the thermal fluid; and
    returning the briny fluid to a geothermal source via an injection well,
    wherein a maintained pressure approximately equivalent to a pressure inside of the geothermal source is maintained by velocity control valves and pumps, and
    wherein the maintained pressure is read by sensors, which provide feedback to the velocity control valves and pumps.

15. The method of claim 14, wherein the second set of heat exchangers exchange heat energy from the molten salt to thermal oil.

16. The method of claim 14, wherein the second set of heat exchangers exchange heat energy from the molten salt to water.

17. The method of claim 14, wherein the second set of heat exchangers is configured to power a remote electric generating unit.

18. The method of claim 16, wherein the water turns to steam via the second set of heat exchangers, wherein the steam powers a steam turbine.

19. A method for collecting heat energy from a briny fluid, the method comprising:
    receiving, by a first set of heat exchangers, the briny fluid from a production well;

transferring, by the first set of heat exchangers, heat energy from the briny fluid to a molten salt, wherein the briny fluid remains in a first closed-loop system apart from the molten salt;
pumping the molten salt to a hot molten salt storage tank;
transferring, by a second set of heat exchangers, heat energy from the molten salt to a molten silicon or a molten glass, wherein the molten salt remains in a second closed-loop system apart from the molten silicon or the molten glass; and
returning the briny fluid to a geothermal source via an injection well.

20. The method of claim 19, wherein the second set of heat exchangers, include electrodes which use energy created within the second closed-loop system.

21. The method of claim 19, wherein a maintained pressure approximately equivalent to a pressure inside of the geothermal source is maintained by velocity control valves and pumps.

22. The method of claim 21, wherein the maintained pressure is read by sensors, which provide feedback to the velocity control valves and pumps.

23. The method of claim 19, further comprising:
transferring, by the second set of heat exchangers, heat energy from the molten salt to electrical energy, wherein said transferring heat energy from the molten salt to the molten silicon or the molten glass includes heating the molten silicon or the molten glass using an electrical resistance coil that includes the electrical energy.

24. The method of claim 19, wherein a state of the molten silicon or molten glass includes a liquid or a solid, and wherein any of the molten silicon or the molten glass is mixed with nano-particles.

25. A geothermal heat collection apparatus comprising:
a heat exchanger configured to transfer heat energy between a briny fluid and a molten salt, the briny fluid being drawn from a geothermal aquifer via a production well, wherein the briny fluid remains in a closed-loop system apart from the molten salt, the closed-loop system extending from the production well to an injection well;
a molten salt storage tank configured to receive the molten salt heated by the heat exchanger; and
the injection well configured to return the briny fluid to the geothermal aquifer,
wherein the closed-loop system maintains an approximately constant pressure from the production well to the injection well.

26. A geothermal heat extraction management system comprising:
a pump disposed within an extraction well;
a first pressure sensor disposed within a geothermal source;
a second pressure sensor disposed within the extraction well;
a heat exchanger configured to transfer heat energy between briny fluid and molten salt; and
a processor connected to the pump and the heat exchanger, the processor configured to:
analyze the difference in pressure readings between the first pressure sensor and the second pressure sensor, instruct the pump to adjust a first pressure within the extraction well to match a second pressure within the geothermal source by increasing or decreasing a flow rate of the briny fluid inside the extraction well.

\* \* \* \* \*